(12) United States Patent
Tawa

(10) Patent No.: US 7,492,804 B2
(45) Date of Patent: Feb. 17, 2009

(54) NEAR-FIELD LIGHT EMITTING DEVICE AND DATA RECORDING/REPRODUCTION APPARATUS

(75) Inventor: Fumihiro Tawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 11/312,665

(22) Filed: Dec. 20, 2005

(65) Prior Publication Data
US 2006/0280103 A1    Dec. 14, 2006

(30) Foreign Application Priority Data
May 24, 2005    (JP) .............. 2005-151419

(51) Int. Cl.
*H01S 3/03*    (2006.01)
(52) U.S. Cl. ............. 372/64; 372/6
(58) Field of Classification Search .......... 372/64, 372/6
See application file for complete search history.

(56) References Cited

U.S. PATENT DOCUMENTS

| | | | |
|---|---|---|---|
| 6,239,901 B1 * | 5/2001 | Kaneko | 359/326 |
| 6,930,975 B2 | 8/2005 | Tawa et al. | |
| 6,950,958 B2 | 9/2005 | Tawa et al. | |
| 2001/0017820 A1 | 8/2001 | Akiyama et al. | |
| 2005/0157393 A1 | 7/2005 | Hasegawa et al. | |
| 2005/0157595 A1 | 7/2005 | Tawa et al. | |

FOREIGN PATENT DOCUMENTS

| | | |
|---|---|---|
| JP | 3231331 | 9/2001 |
| JP | 3492270 | 11/2003 |
| JP | 2004-30840 | 1/2004 |
| JP | 2004-255732 | 9/2004 |
| WO | WO 2004/068235 | 8/2004 |
| WO | WO 2004/088650 | 10/2004 |

\* cited by examiner

*Primary Examiner*—Dung T Nguyen
(74) *Attorney, Agent, or Firm*—Greer, Burns & Crain, Ltd.

(57) ABSTRACT

A near-field light emitting device includes a deflecting unit that deflects electromagnetic waves propagated through a core toward a base. A propagating unit arranged on the base emits near-field light from an outlet. By providing a magnetic head on a side opposite to the base, a distance between the magnetic head and an intensity center of the near-field light can be minimized. The deflecting unit is formed comparatively thick, therefore, the electromagnetic wave is caused to enter the propagating unit at such an angle that causes a surface-propagating wave to be generated highly efficiently.

11 Claims, 7 Drawing Sheets

NEAR-FIELD LIGHT EMITTING DEVICE AND DATA RECORDING/REPRODUCTION APPARATUS

BACKGROUND OF THE INVENTION

1. Field of the Invention

The present invention relates to a near-field light emitting device and a data recording/reproduction apparatus provided with the near-field light emitting device.

2. Description of the Related Art

With increase of information to be handled, information recording methods and information recording/reproduction apparatuses that can dramatically enhance the recording density are in increasing demand. To increase the recording density, a near-field light that forms a beam spot that is even smaller than a wavelength of an incident light is attracting attention.

The near-field light can be used in optical disk. Investigation, however, on how near-field light can be applied in a magnetic recording apparatus is ongoing. To increase the recording density of a magnetic recording medium, it is necessary that the magnetic recording medium be formed with a magnetically stable material. However, a magnetically stable material makes it difficult to write information on the magnetic recording medium. Therefore, a recording method known as heat (light)-assisted recording method has currently come to be studied.

Heat-assisted recording method involves increasing the temperature at a portion in which information is to be written by applying a beam, temporarily making the portion easily writable, before information is written on the magnetic recording medium by the magnetic head. A recording density of over 1 terabit per square inch (Tbpsi) is expected to be realized by applying near-field light in the heat-assisted recording method.

In the heat-assisted recording method, it is important to make a distance between a magnetic core of the magnetic head and the beam spot short. If the distance is long, the temperature of the portion comes down, making it difficult to write information on the magnetic recording medium.

In a technology disclosed in, for example, Japanese Patent Application No. 2004-255732, the beam outlet is arranged close to the magnetic head. In this technology, a device that emits the near-field light is formed on the same wafer as the magnetic head by lithography. Moreover, a multilayer structure of the near-field light emitting device is made asymmetrical to bring the beam outlet closer to the magnetic head.

However, in the above technology, a thickness of a cladding of an optical waveguide that propagates the laser to the device is not considered. The cladding covers the core of the optical waveguide and is essential for the laser to be propagated to the device without attenuation. The thickness of the cladding should be about the wavelength of the laser. Therefore, the magnetic head and the beam spot are separated by a distance equivalent to the thickness of the cladding.

If the thickness of the cladding is reduced to less than the wavelength of the laser, when the laser comes in contact with a material that is thinner than the cladding thickness and that has a higher absorption coefficient, such as a material used for the magnetic head, absorption occurs on the surface, resulting in attenuation of the laser. Furthermore, absorption of the laser generates heat, resulting in degradation of the magnetic head.

SUMMARY OF THE INVENTION

It is an object of the present invention to at least solve the above problems in the conventional technology.

A light emitting device according to one aspect of the present invention includes a wave guiding unit arranged on a base of the light emitting device and configured to propagate an electromagnetic wave; an emitting unit arranged on the base and configured to emit near-field light from propagated electromagnetic wave; and an outlet from which the near-field light is output. The emitting unit includes a deflecting unit configured to deflect the propagated electromagnetic wave toward the base; and a propagating unit arranged between the deflecting unit and the base, and configured to generate a surface-propagating wave from deflected electromagnetic wave, to output the near-field light from the outlet, and the outlet is arranged at an end of the propagating unit on a side opposite to the wave guiding unit.

A data recording/reproduction apparatus according to another aspect of the present invention includes a light emitting device according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a perspective view of the near-field light emitting device 100a;

FIG. 3 is a schematic for illustrating a result of a simulation for electric field intensity of the near-field light emitting device 100a;

FIG. 4 is a schematic for illustrating a result of a simulation for electric field intensity of the near-field light emitting device 100a;

DETAILED DESCRIPTION OF THE PREFERRED EMBODIMENTS

Exemplary embodiments according to the present invention are explained in detail below with reference to the accompanying drawings.

Figure 1:
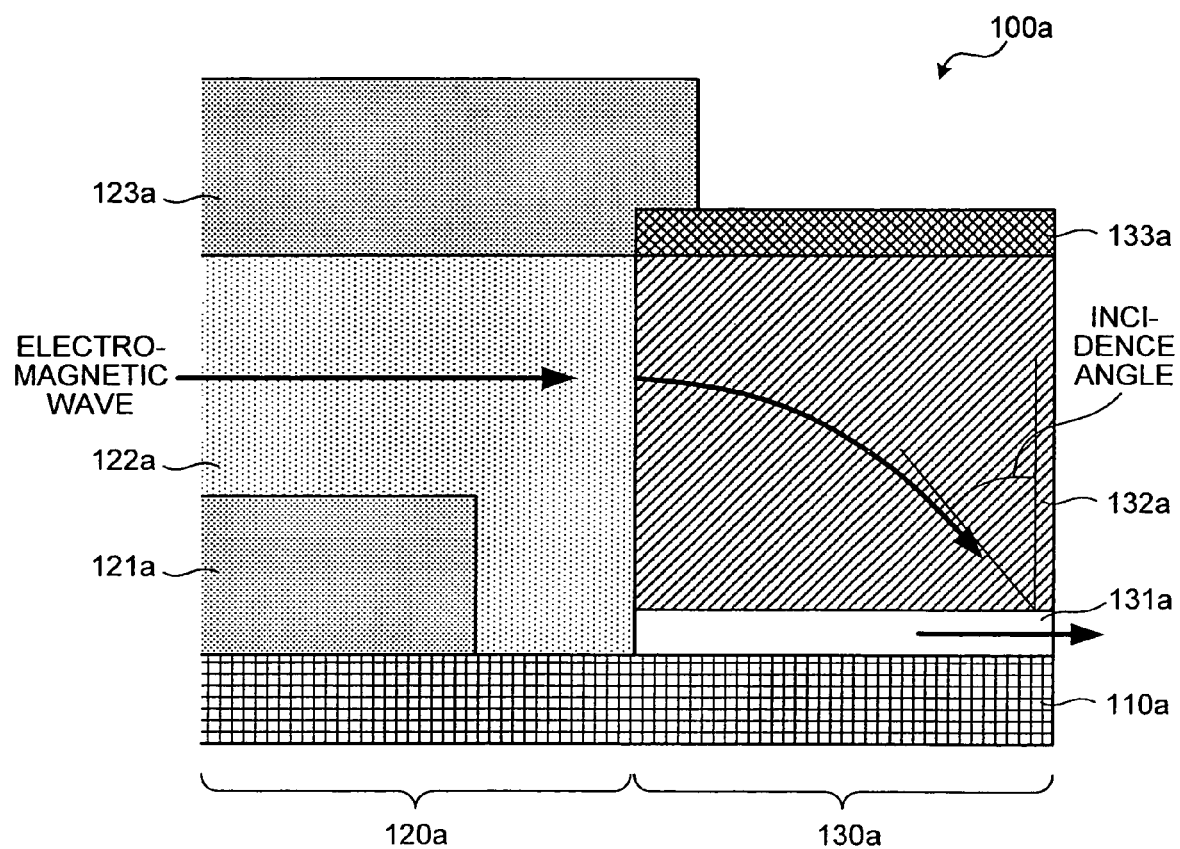
FIG. 1 is a cross-section of a near-field light emitting device 100a according to an embodiment of the present invention.

FIG. 1 is cross-section of a near-field light emitting device 100a according to an embodiment of the present invention. As shown in FIG. 1, the near-field light emitting device 100a is set on a base 110a on which are mapped other elements such as a magnetic head. The near-field light emitting device 100a includes an optical waveguide 120a and an emitter 130a.

The optical waveguide 120a guides the electromagnetic waves (light) to the emitter 130a. The optical waveguide 120a consists of a core 122a covered by a cladding 121a and a cladding 123a. It is not shown in FIG. 1, but the cladding 123a also covers the side of the core 122a. The core 122a propagates the electromagnetic waves. The claddings 121a and 123a prevent attenuation of the electromagnetic waves.

The emitter 130a produces the near-field light and is in the form of a multilayered structure set on the base 110a. The emitter 130a includes a surface propagating unit 131aa deflecting unit 132a, and an etching mask material 133a stacked.

The surface propagating unit 131a generates surface-propagating waves from the incident electromagnetic waves and emits near-field light from an opening provided at the end opposite to the optical waveguide 120a. Specifically, the surface propagating unit 131a generates the surface-propagating waves by virtue of the material it is composed of and which comes in contact with the incident light and the complex refractive index of the material. The complex refractive index of the material facing the incident light is defined as being equal to n−j·k, where n is a real part of the refractive index, k is an imaginary part, and j is an imaginary number, j^2=−1. The surface propagating unit 131a is a structure composed of an opaque material having a large k value and a larger absolute value of the dielectric constant than the dielectric constant n^2−k^2 of a dielectric material sandwiching or enveloping the transparent dielectric material having a small k value.

For electromagnetic waves having a wavelength λ of 400 nanometers (nm), the surface propagating unit 131a is mapped by sandwiching or enveloping a transparent material such as SiO2 (n=1.48) or MgF2, with a material with a relatively larger refractive index and k value such as Si. An outlet is mapped in the surface propagating unit 131a. The surface propagating unit generates the surface-propagating waves from the electromagnetic waves that have penetrated through the Si layer at the Si-SiO2 junction and emits near-field light from the outlet.

To generate the surface-propagating waves, it is the larger difference in the dielectric constants between the two materials is better. For instance, at the junction of SiO2 (n=1.48), which is a transparent material with a low refractive index, and Si (n−4.380, k=2.02), which is a material with a high refractive index, the surface-propagating waves are produced on the side of the material having a low refractive index and a small k value.

Materials with high refractive index, such as Si, have a large k value, which indicates attenuation rate, leading to attenuation of the electromagnetic waves when being propagated. Therefore, the propagation distance of the surface-propagating waves from the junction with the Si layer should be as short as possible. Therefore, it is preferable that the surface-propagating waves be produced close to the outlet at the front end of the light emitting device. On the other hand, it is advantageous for the electromagnetic waves to be absorbed by the Si as it reduces the attenuation of electromagnetic waves due to absorption by other layers. As the intensity from the other layers reduces, the near-field spot profile can be reduced. Reproduction of these distances can be ensured to a precision of Å unit in a film-forming device.

A layer of a material having a medium refractive index (such as ZnS, etc.) and having a small or more or less zero k value can be sandwiched between the low refractive index material and the high refractive index material. The surface-propagating waves produced at the junction of ZnS and SiO2 can thus counter the attenuation due to Si and increase the efficiency. However, the distance of the outlet from the base 110a will increase by the extent of the thickness of the medium refractive index material.

The deflecting unit 132a deflects the electromagnetic waves propagated through the optical waveguide 120a toward the surface propagating unit 131a. Specifically, the deflecting unit 132a is composed of at least two types of dielectric materials having different refractive indices, the composition ratio of the dielectric materials varying gradually. Alternatively, the deflecting unit 132a may be composed of at least two types of materials having different refractive indices and stacked one on top of the other, and several such units stacked one on top of another. Another alternative structure of the deflecting unit 132a would be just one type of transparent material that reflects the electromagnetic waves.

The etching mask material 133a is a mask for forming the surface propagating unit 131a and the deflecting unit 132a by etching.

As shown in FIG. 1, in the near-field light emission method according to the present embodiment, the outlet through which the near-field light is disposed against the base 110a. Consequently, appropriate cladding thickness can be provided, and yet the distance between the magnetic head and the outlet can be kept at minimum.

Providing the outlet against the base 110a would require that the electromagnetic waves be deflected significantly by the deflecting unit 132a toward the base 110a. This large deflect angle can be realized by an appropriate combination of the materials that make up the deflecting unit 132a.

In the near-field-light emission method according to the present embodiment, the surface propagating unit 131a is a thin layer formed against the base 110a. Therefore, in order that the electromagnetic waves that are propagated through the optical waveguide 120a is propagated without loss in the deflecting unit 132a, the thickness of the deflecting unit 132a needs to be equal to or greater than the sum of the thickness of the cladding 121a and the core 122a, not taking into account the thickness of the surface propagating unit 131a.

The incidence angle should be specific in order for the surface propagating unit 131a to efficiently produce the surface-propagating waves. In the near-field light emission method according to the present invention, a relatively thick deflecting unit 132a is advantageous in adjusting the incidence angle by deflecting the electromagnetic waves. The incidence angle is determined by the effective refractive indices of the surface propagating unit 131a and the deflecting stricture 132a. In the present embodiment, the incidence angle is 55 degrees.

Figure 2:
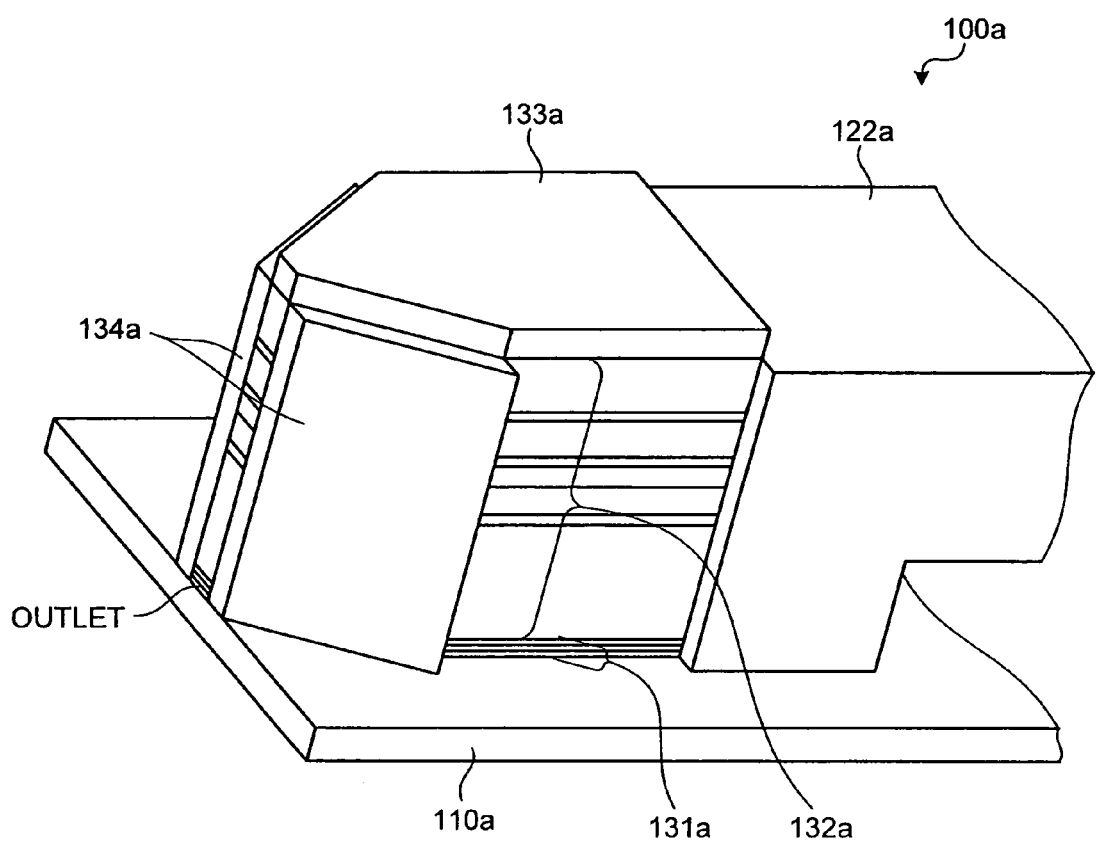

The structure of the near-field light emitting device 100a according to the present embodiment is explained next. FIG. 2 is a perspective view of the near-field light emitting device 100a. As shown in FIG. 2, the emitter 130a sits on the base 110a on which is mapped the magnetic head and is in the form of a polygonal column consisting of an isosceles trapezium with a square sharing a side with the longer side of the isosceles trapezium. The front end of the core 122a of the optical waveguide 120a is joined to the surface of the emitter 130a opposite to that of the isosceles trapezium. The other end of the optical waveguide 120a is joined to a not shown unit that couples the optical waveguide 120a to a laser beam by methods such as lens coupling, end injection, and cladding.

The emitter 130a includes the surface propagating unit 131a, the deflecting unit 132a, the etching mask material 133a, stacked one on top of the other, with the etching mask material 133a forming the topmost layer, and further includes two sloped side walls 134a forming the isosceles part of the isosceles trapezium portion of the surface propagating unit 131a and the deflecting unit 132a. The surface propagating unit 131a is a multi-layer structure composed of multiple layers of a transparent dielectric material, each layer having a thickness not greater than the wavelength of the electromagnetic waves. The deflecting unit 132a is also a multi-layer structure having an effective refractive index distribution.

The electromagnetic waves propagated through the optical waveguide 120a are deflected toward the base 110a of the polygonal column by the multi-layer structure of the deflecting unit 132a and is condensed toward the interior by the sloped side walls 134a. The surface propagating unit 131a condenses the electromagnetic waves emerging from the deflecting unit 132a by the sloped side walls 134a toward the interior and emits the near-field light from the outlet smaller not greater than the wavelength. The sloped side walls 134a prevent the light from escaping except through the outlet.

The emitter 130a can be manufactured by using lithography technique. Depositions for the base 110a, the surface propagating unit 131a, and the deflecting unit 132a are made sequentially on the entire wafer. Next etching of the polygonal column isolating the multi-layer structure of the surface propagating unit 131a and the deflecting unit 132a is carried out. Next, depositions for the sloped side walls 134a of the light emitting device are made. The cladding 121a for the optical waveguide 120a, the core 122a, and the cladding 123a are then sequentially patterned using lift-off technique or etching.

In FIG. 1, the core 122a is L-shaped to prevent the cladding 121a from being joined to the emitter 130a. When forming the cladding layer, this prevents the cladding 121a from covering the emitter 130a where the core 122a is joined to the emitter 130a.

Thus, the cladding 121a is formed without covering the contact region where the emitter 130a and the core 122a are joined. Alternatively, even if the contact region is covered by the cladding 121a, etching technique can be used to remove the cladding in the contact region so that the core 122a and the emitter 130a can be in contact with each other. However, the latter technique involves increased manufacturing process.

The surface propagating unit 131a consists of stacked sets of layers, each set of layers consisting of a layer of SiO2 (n=1.48) having a thickness of 16 nm sandwiched on either side by a layer of Si (n=4.380, k=2.02) having a refractive index difference of not less than 1.0 and a thickness of 24 nm. The overall thickness of the surface propagating unit 131a formed in this way is 64 nm.

The deflecting unit 132a is composed of alternating layers of Ta2O5 and SiO2 stacked one on top of the other. From the surface propagating unit 131a, the Ta2O5 and SiO2 layers are in the following sequence: 448 nm thickness Ta2O5, 20 nm SiO2, 100 nm Ta2O5, 70 nm SiO2, 70 nm Ta2O5, 120 nm SiO2, 20 nm Ta2O5, and 220 nm SiO2. This makes the overall thickness of the deflecting unit 1068 nm.

Varying the thickness of the layers of Ta2O5 and SiO2 has the effect of deflecting all the electromagnetic waves propagated through the optical waveguide 120a toward the direction of deposition and causing the electromagnetic waves to be incident near the outlet of the surface propagating unit 131a. In the present embodiment, the width of the deflecting unit 132a in the direction perpendicular to the direction of deposition is kept 1.0 micrometers (μm), the distance between surface that is in contact with the core 122a of the optical waveguide 120a and the outlet is kept as 1.52 μm and the facing angle of the isosceles sides is kept as 75 degrees.

The incidence angle of the electromagnetic waves incident on the surface propagating unit 131a from the deflecting unit 132a is set as 55 degrees, angle which is close to the angle that causes the surface propagating unit 131a to generate the surface-propagating waves most efficiently.

All surfaces of the deflecting unit 132a other than the surface that is joined to the optical waveguide 120a are covered by a material group having high reflectivity of the electromagnetic waves. The high reflectivity material should preferably be a material that satisfies the total reflection condition sin θ>n2/n1, where n1 is the effective refractive index of the sloped side walls, n2 is that of the dielectric material coating, and θ is the incidence angle at the sloped side walls, the sloped walls being the surfaces joined to the isosceles sides of the isosceles trapezoid except for the outlet.

Alternatively, it is preferable to use a material having a negative specific inductive capacity, that is a material having n^2-k^2<0, such as aluminum (n–0.49, k=4.86), and gold, for sloped side walls 134a so that the light beam is reflected inside the surface propagating unit 131a at least by the sloped side walls 134a.

A layer of Al of 100 nm thickness is deposited as a mask on top of the deflecting unit 132a during the etching process. This layer of Al corresponds to the etching mask material 133a. Further, Ta2O5, for example, can be used for the core of the optical waveguide 120a and SiO2 can be used for the cladding.

Thus, using a two-dimensional pattern with no parameters in the depth direction removes the constraint of the orientation of the crystal on the substrate and makes it amenable to use substrates other than Si. Whereas, the conventional reverse-pyramid-shaped light emitting device needs to be mounted on a Si substrate. Further, in the present embodiment, any vertex angle can be set for the polygonal column. The deposition precision of the latest film-forming devices are to the tune of a few Å to several Å compared to crystal etching method. Consequently, mapping errors can be drastically reduced.

The thickness of the transparent dielectric layer of the surface propagating unit 131a determines the profile of the near-field light emitted from such a two-dimensional multi-layered structure along the deposition direction. The shape of the outlet of the light emitting device determines the profile of the near-field light perpendicular to the deposition direction. Thus, in the near-field region a beam spot that is more minute than the wavelength in the free space beyond the diffraction limit can be obtained.

Even if a minute beam spot size is achieved, it is difficult to realize a recording density greater than 1 terabit per square inch. If this near-field light is applied in a heat-assisted magnetic recording/reproduction apparatus as a heat source that heats the magnetic recording medium, the aforementioned recording density can be realized as the recording density is determined by the magnetic head. In this instance, the magnetic core of the magnetic head that is used in writing is several nanometers in size. Therefore, the light emitting device should be nano-sized.

In the heat-assisted recording method, the temperature of magnetic recording medium is first raised by the beam emitted by the light emitting device. Then data is written by the magnetic field produced by the coil. Thus, comparatively less magnetic field strength is required for writing data.

The near-field light emitting device 100a according to the present embodiment is applied to a heat-assisted magnetic recording/reproduction apparatus. However, the near-field light emitting device 100a according to the present embodiment produces a minute beam spot, it can also be used as a light emitting device for a phase change type optical disk apparatus or magneto optic disk device. The near-field light emitting device 100a can also used be as an optical circuit device as the minute beam spot is formed close to the bottom surface.

In a structure with the light emitting device coming first and then the magnetic head from the slider end, if the outlet of the light emitting device is not of the same shape as the writing core of the magnetic head or if the light emitting device is larger than the magnetic head, the magnetic head should be mapped first and the light emitting device should be mapped on top of the magnetic head. If the board on which the magnetic head is mapped is considered as the slider, the order of the setup for producing the beam for carrying out recording seems reversed. The recording in this case can be carried out by bonding the light emitting device to the slider.

Figure 3:
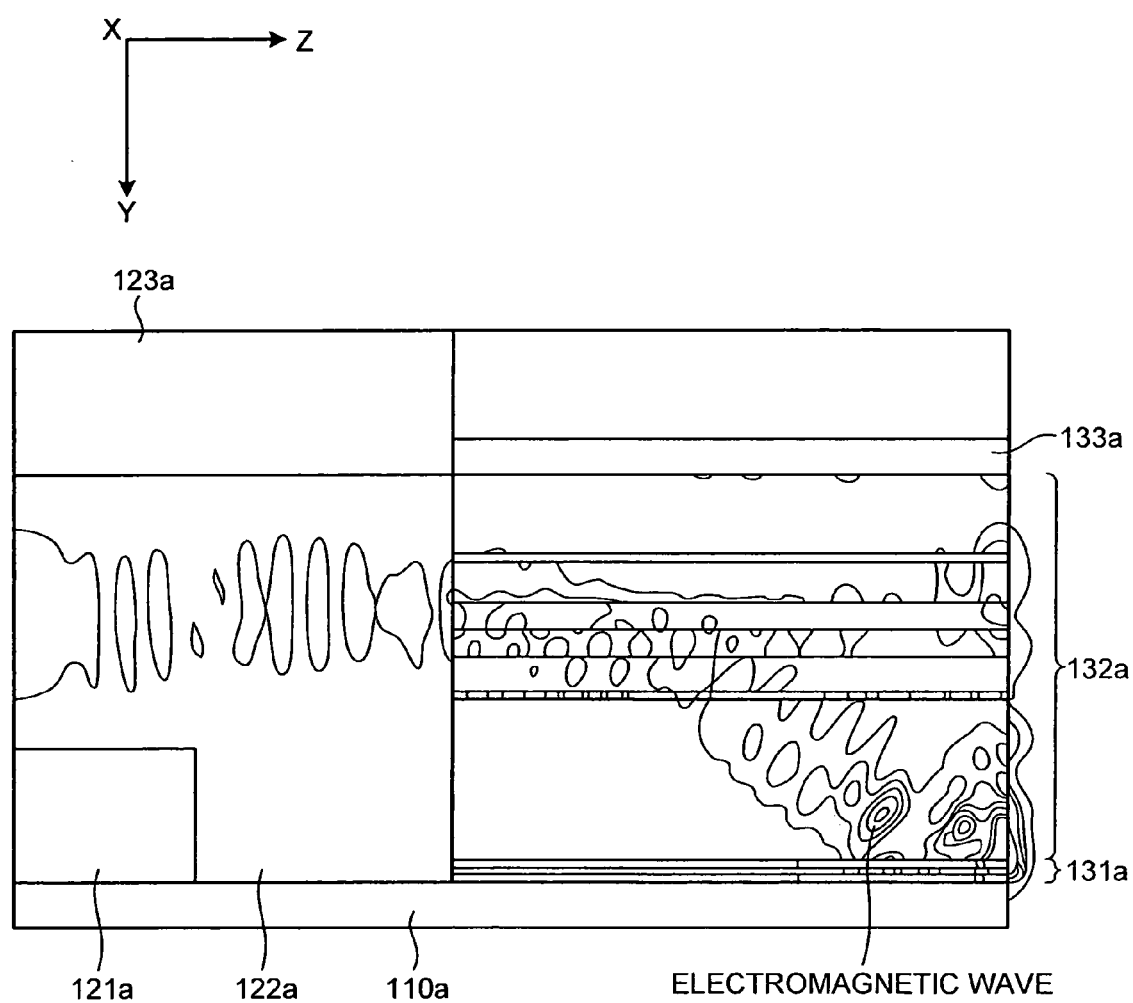

FIG. 3 is a schematic of the YZ surface represented on a linear scale of maximum 20 (V/m)^2, illustrating a result of a simulation for the electric field intensity (V/m)^2 of the near-field light emitting device 100a shown in FIG. 2. As shown in FIG. 3, the electromagnetic waves having a wavelength λ=400 nm propagating along the Z axis, propagates through the core 122a of the optical waveguide 120a composed of SiO2, is deflected by the multi-layered deflecting unit 132a in the direction of the stacking, and is distributed as light intensity in the void from the central portion of the outlet of the surface propagating unit 131a.

Figure 4:
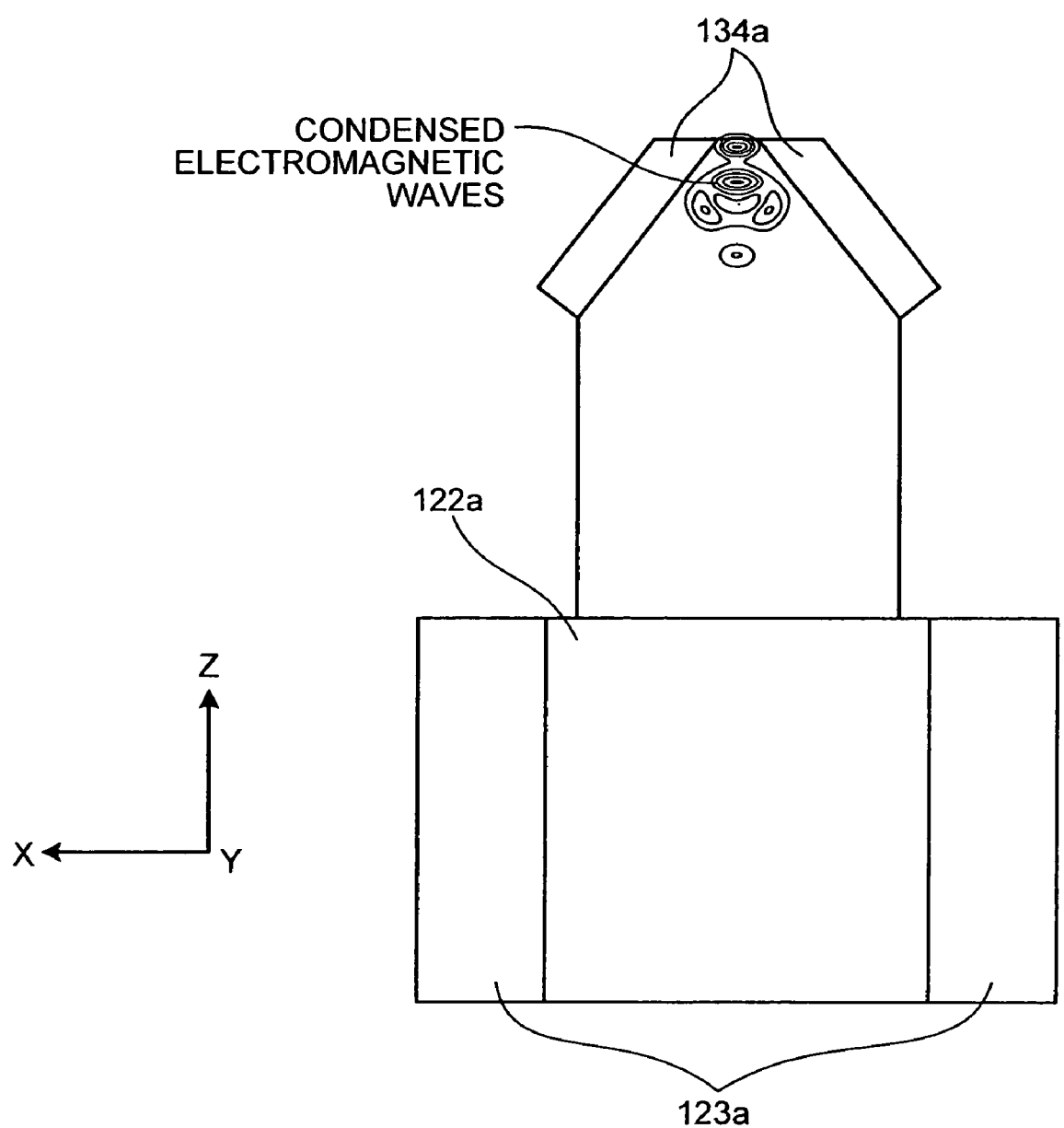

FIG. 4 is a schematic of the SiO2 layer of the surface propagating unit 131a represented on the XZ surface on a linear scale of maximum 100 V/m^2. The electromagnetic waves having a wavelength λ=400 nm propagated along the Z axis is condensed near the outlet of the SiO2 layer, gains magnetic field intensity and is distributed as light intensity in the void from the central portion of the outlet. Different scales are used for the YZ surface and XZ surface to show the propagation of the electromagnetic waves in the core 122a and the deflecting unit 132a of the YZ surface.

In such a structure, loss of the electromagnetic waves propagated through the optical waveguide 120a due to absorption or reflection by the deflecting unit 132a is negligible. Further, the electromagnetic waves are incident on the surface propagating unit 131a at an appropriate angle, producing surface-propagating waves, thereby enabling extremely efficient emission of near-field light from the outlet.

Further, even though propagation rate may vary, the spot profile can be changed by varying the thickness and width of the outlet of the surface propagating unit 131a in the direction of stacking according to requirement. For example, keeping the rest of the structure identical, if only the SiO2 layer of the surface propagating unit 131a is made thinner, the spot profile can be reduced, even though the propagation rate will also go down. Similarly, if the width of the outlet is narrowed, the spot size can be reduced, even though the propagation rate reduces steeply with the reduction in the layer thickness.

An example of manufacturing process of the light emitting device is explained next. The magnetic head is manufactured first. The near-field light emitting device is leveled over the magnetic head and the surface propagating unit 131a and the deflecting unit 132a are deposited by lithography exposure process, and the etching mask material is deposited by ion plating method.

Resist is left on the polygonal pattern of the near-field light emitting device by subjecting it to electron beam (EB). The etching mask material 133a is first etched. For example, if Al is used as the etching mask material 133a, chlorine gas is used for etching. Next, the deflecting unit 132a and the surface propagating unit 131a are etched in one go sing halogen gas. The solid structure of the emitter 130a is thus completed.

Next the cladding 121a of the optical waveguide 120a is mapped by deposition and lift-off method and the core 122a is similarly mapped by deposition and lift-off method. The core 122a of the optical waveguide 120a is covered by resist. The exposed side walls of the polygonal cylindrical portion and the superfluous portions on the patterns of the cladding 121a and the core 122a are covered with aluminum to create the sloped side walls 134a. The cladding 123a is mapped so as cover the core 122a. By following this sequence, the leakage of the light from the superfluous portions on the patterns of the cladding 121a and the core 122a can be prevented. Finally, a dicer is used to cut the substrate into chips, and the outlet is opened by focused ion beam (FIB) or ion milling.

In the present embodiment, the thickness of the SiO2 layer which functions as the low refractive index material in the deflecting unit 132a is 30 nm. This thickness can be increased to obtain a thicker profile.

Further, in the present embodiment, first the head (such as the magnetic head) is mapped and thereafter the near-field light emitting device 100a is mapped.

Thus, according to the first embodiment, the electromagnetic waves are significantly deflected toward the base 110a by the deflecting unit 132a. The surface propagating unit 131a that is disposed against the base 110a receives the electromagnetic waves and emits it as near-field light through the outlet. Consequently, the distance between the base 110a and the intensity center of the emitted near-field light is minimized. By mapping the magnetic head on the side opposite to the base 110a, the distance between the magnetic head and the intensity center of the near-field light emitted from the outlet is shortened.

Further, according to the first embodiment, the deflecting unit 132a that deflects the electromagnetic waves toward the base 110a is comparatively thick. It therefore causes the electromagnetic waves to be incident on the surface propagating unit 131a at an angle that enables highly efficient production of surface-propagating waves.

Figure 5:
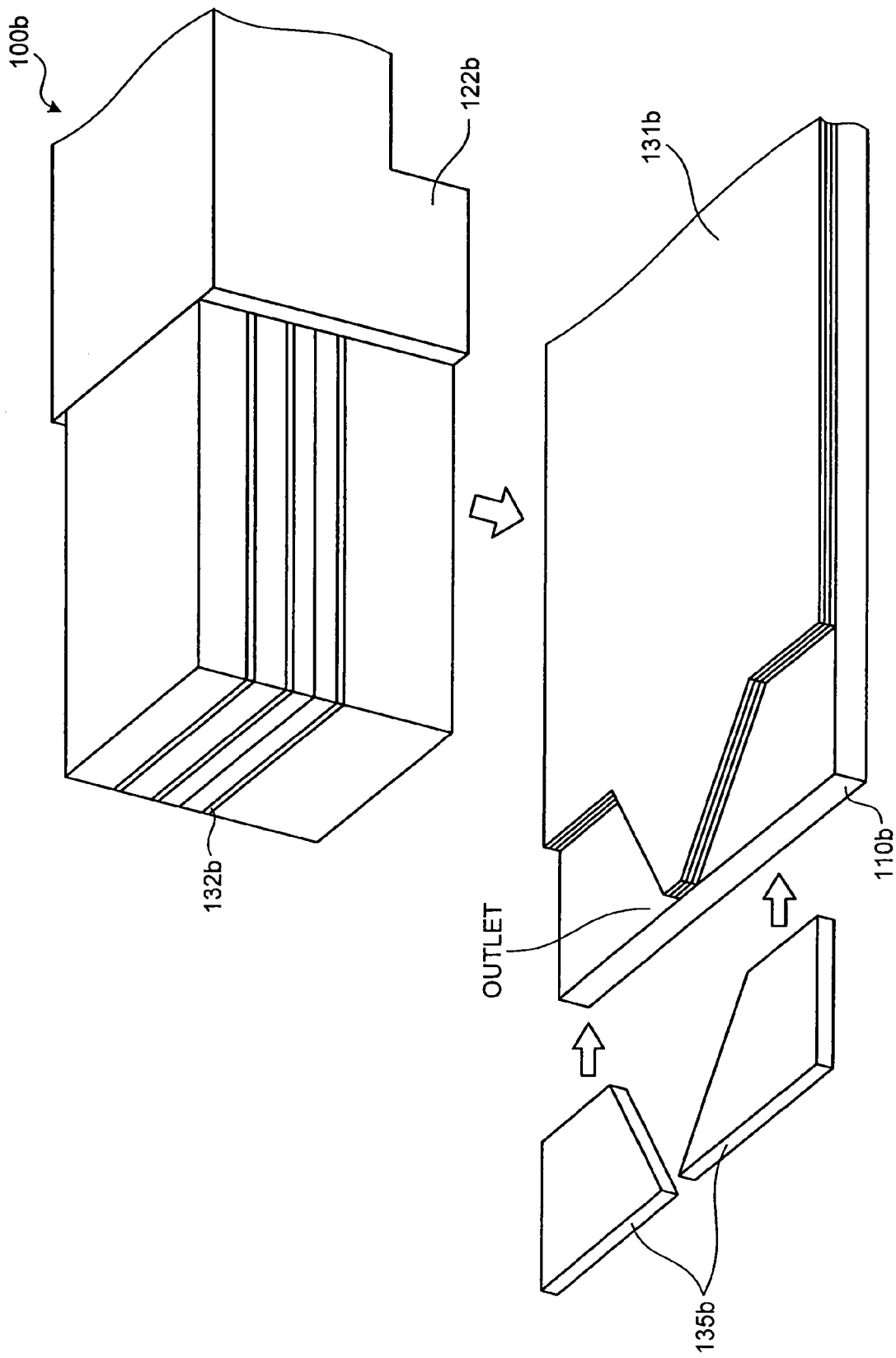
FIG. 5 is a perspective view of a near-field light emitting device 100b according to an embodiment of the present invention.

FIG. 5 is a perspective view of a near-field light emitting device 100b according to an embodiment of the present invention. A deflecting unit 132b shown in FIG. 5 differs from the deflecting unit 132a shown in FIG. 2. The deflecting unit 132b condenses the electromagnetic waves in the deposition direction but not in the direction perpendicular to the deposition direction. Specifically, the outlet face does not have the shape of isosceles sides. Accordingly, there is no structure that corresponds to the sloped side walls 134a.

A surface propagating unit 131b has a structure similar to the surface propagating unit 131a. That is, the surface propagating unit 131b forms an isosceles trapezium, the facing isosceles sides tapering to form a narrow end and the bottom of the narrow end forming the outlet. The surfaces joined to the isosceles sides are covered by a reflective material 135b such as Al. The reflective material 135b inwardly reflects the electromagnetic waves highly efficiently.

Thus, the near-field light emitting device 100b according to the present embodiment has a disadvantage of reduced production efficiency of the near-field light from the outlet of the surface propagating unit 131b as the deflecting unit 132b does not condense the electromagnetic waves in the direction perpendicular to the deposition direction. However, the advantage of the near-field light emitting device according to the present invention is that, since only the surface propagating unit 131b has the shape of an isosceles trapezium, a more precise patterning and etching of the narrow side of the isosceles trapezium can be carried out because the resist and the aspect ratio of the device pattern can be reduced during etching.

The deflecting unit 132b is a rectangular parallelepiped. However, the deflecting unit 132b can also be made rounded by lithography mapping process as long as it is able to deflect the light beam in the deposition direction.

Further, the exit surface of the surface propagating unit 131b and the exit surface of the deflecting unit 132b need not necessarily be aligned. As near-field light can be obtained from the exit surface of the surface propagating unit 131b even if the exit surface of the deflecting unit 132b is receded toward the waveguide end into the isosceles trapezium shape of the surface propagating unit 131b, precision in the alignment of the two exit surfaces can be relaxed. However, there is reduction in the production efficiency of the near-field light proportional to the extent to which the two exit surfaces are out of alignment.

Figure 6:
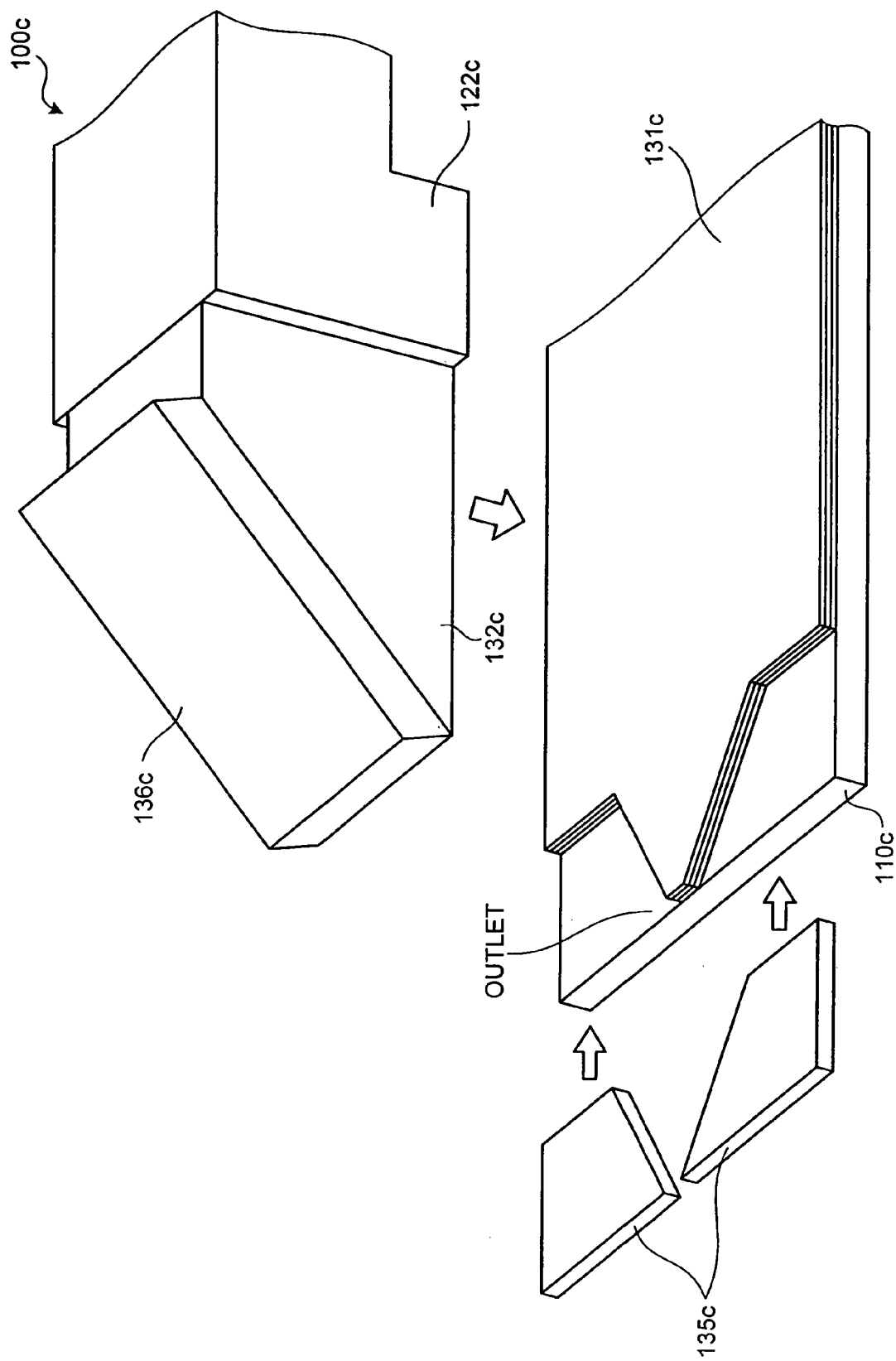
FIG. 6 is a perspective view of a near-field light emitting device 100c according to an embodiment of the present invention.

FIG. 6 is a perspective view of a near-field light emitting device 100c according to an embodiment of the present invention. The near-field light emitting device 100c has, instead of a multi-layer structure, a single layer deflecting unit 132c that slopes toward the outlet, having a reflective surface 136c on the sloping face. Even if the deflecting unit 132b is of the same shape as the deflecting unit 132c, the same result as for the structure shown in FIG. 5 can be obtained. Thus, the deflecting unit and the surface propagating unit may be of different shapes. FIG. 5 and FIG. 6 do not show the etching material on the cladding and the deflecting unit.

Thus, in the second embodiment, the precision of alignment of the deflecting unit and the surface propagating unit can be relaxed as the electromagnetic waves are not condensed in the direction perpendicular to the deposition direction of the deflecting unit. Further, as only the surface propagating unit is shaped like an isosceles polygon, processing precision for mapping the outlet on the narrow base of the isosceles polygon can be enhanced.

Figure 7:
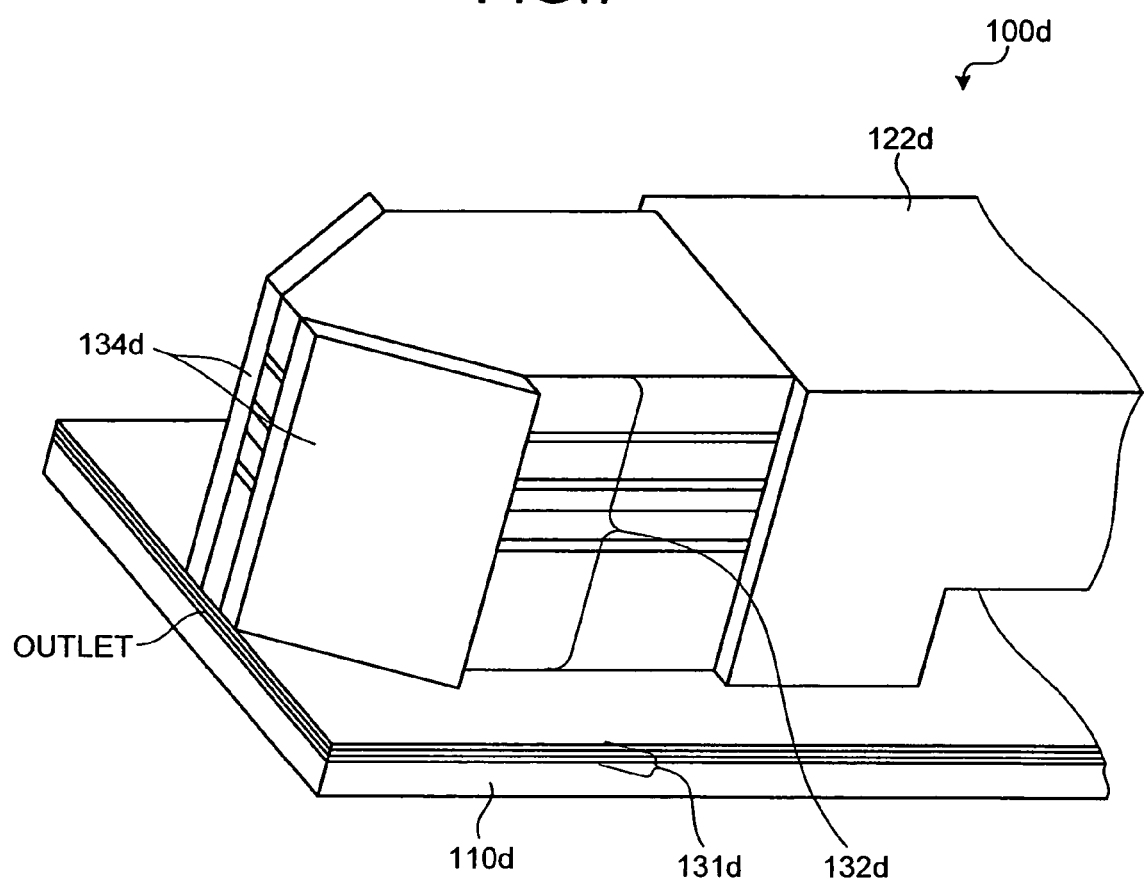
FIG. 7 is a perspective view of a near-field light emitting device 100d according to an embodiment of the present invention.

FIG. 7 is a perspective view of a near-field light emitting device 100d according to an embodiment of the present invention. A deflecting unit 132d shown in FIG. 7 condenses the light beam in the deposition direction, similar to the deflecting unit 132a shown in FIG. 1. In addition, the deflecting unit 132d also condenses the light beam in the direction perpendicular to the deposition direction.

The near-field light emitting device 100d has a surface propagating unit 131d is a planar layer, unlike the surface propagating unit 131a. As the light beam is not actively condensed in the direction perpendicular to the deposition direction in the light propagating structure 131d, a beam spot wider than the diameter of the base of the narrow end of the isosceles trapezium shape of the deflecting unit 132d is formed.

However, in the near-field light emitting device 100d according to the present invention, materials that are difficult to etch can be used for the surface propagating unit 131d. In the surface propagating unit 131a shown in FIG. 1, the transparent dielectric layer is composed of SiO2 and Si is used as the opaque material. In the surface propagating unit 131d, a low refractive index material MgF2 can be used instead of SiO2, and Al can be used as the opaque material.

Thus, using a material having low refractive index as the transparent dielectric layer causes dielectric variance and improves the production efficiency of the surface-propagating waves. However, materials like MgF2 and Al are not easily etched by halogen gas, used for etching the oxides present in the major part of the device. Even if etching of MgF2 and Al is carried out, they cause side-etching of other materials during the process.

Thus, in the third embodiment, the surface propagating unit does not condense the electromagnetic waves in the direction perpendicular to the deposition direction. Consequently, materials that are difficult to be etched can be used for the surface propagating unit.

According to the embodiments described above, it is possible to minimize a distance between a magnetic head and an intensity center of a near-field light.

According to the embodiments described above, it is possible to cause electromagnetic waves to be incident at an angle that causes to generate surface-propagating waves highly efficiently.

According to the embodiments described above, it is possible to condense electromagnetic waves near an outlet from which a near-field light is output, thereby improving production of near-field light.

According to the embodiments described above, it is possible to provide a data recording/reproduction apparatus that realizes high recording density.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A light emitting device, comprising:
    a wave guiding unit arranged on a base of the light emitting device and configured to propagate an electromagnetic wave;
    an emitting unit arranged on the base and configured to emit near-field light from propagated electromagnetic wave; and
    an outlet from which the near-field light is output, wherein the emitting unit includes
        a deflecting unit configured to deflect the propagated electromagnetic wave toward the base; and
        a propagating unit arranged between the deflecting unit and the base, and configured to generate a surface-propagating wave from deflected electromagnetic wave, to output the near-field light from the outlet,
    the outlet is arranged at an end of the propagating unit on a side opposite to the wave guiding unit, and
    the propagating unit is formed to extend over in a direction substantially parallel to a plane of the base so that the near-field light outputs in a direction substantially parallel to the plane.

2. The light emitting device according to claim 1, further comprising a cladding arranged between a core of the wave guiding unit and the base, wherein
    the deflecting unit has a thickness that is not less than a value obtained by subtracting a thickness of the propagating unit in a direction of a multilayered structure from a sum of a thickness of the core and a thickness of the cladding in the direction.

3. The light emitting device according to claim 1, wherein the deflecting unit is formed with at least two types of materials having different refractive indexes in a layered structure.

4. The light emitting device according to claim 1, wherein the deflecting unit is configured to deflect the electromagnetic wave with a reflective surface.

5. The light emitting device according to claim 1, wherein the deflecting unit is configured to cause the electromagnetic wave to enter the propagating unit at an angle that enables the most efficient generation of surface-propagating wave.

6. The light emitting device according to claim 1, wherein, the propagating unit is configured to have a structure in which a first material is sandwiched between or surrounded by a second material, the first material being transparent and having a small value for k in a complex refractive index $n-j \cdot k$ with respect to the electromagnetic wave, where n is a real part of the refractive index, k is an imaginary part, and j is an imaginary number of $j^2=-1$, the second material having a larger absolute value of a dielectric constant $n^2-k^2$ than that of the first material.

7. The light emitting device according to claim 1, wherein the deflecting unit is configured to have a tapered structure that narrows toward the outlet.

8. The light emitting device according to claim 7, wherein the deflecting unit includes a reflecting structure configured to reflect the electromagnetic wave inwardly on sides of the tapered structure.

9. The light emitting device according to claim 1, wherein the propagating unit is configured to have a tapered structure that narrows toward the outlet.

10. The light emitting device according to claim 9, wherein the propagating unit includes a reflecting structure configured to reflect the electromagnetic wave inwardly on sides of the tapered structure.

11. A data recording/reproduction apparatus that includes a light emitting device, wherein the light emitting device includes a wave guiding unit arranged on a base of the light emitting device and configured to propagate an electromagnetic wave;

an emitting unit arranged on the base and configured to emit near-field light from propagated electromagnetic wave; and an outlet from which the near-field light is output, wherein the emitting unit includes a deflecting unit configured to deflect the propagated electromagnetic wave toward the base; and a propagating unit arranged between the deflecting unit and the base, and configured to generate a surface-propagating wave from deflected electromagnetic wave, to output the near-field light from the outlet, the outlet is arranged at an end of the propagating unit on a side opposite to the wave guiding unit, and the propagating unit is formed to extend over in a direction substantially parallel to a plane of the base so that the near-field outputs in a direction substantially parallel to the plane extending.

\* \* \* \* \*

UNITED STATES PATENT AND TRADEMARK OFFICE
CERTIFICATE OF CORRECTION

PATENT NO.         : 7,492,804 B2                                                  Page 1 of 1
APPLICATION NO.    : 11/312665
DATED              : February 17, 2009
INVENTOR(S)        : Tawa It is certified that error appears in the above-identified patent and that said Letters Patent is hereby corrected as shown below:

On the Title Page of the Patent Item [56]:

In the Second Column    After "FOREIGN PATENT DOCUMENTS" please insert:
    -- JP    2003-998635
       JP    2004-551177
       JP    HE114-999281
       PCT  PCT/JP2004/06532 --

Signed and Sealed this

Twenty-third Day of June, 2009

JOHN DOLL
*Acting Director of the United States Patent and Trademark Office*